United States Patent [19]

Cady et al.

[11] 4,454,301

[45] Jun. 12, 1984

[54] CROSSLINKING COATING COMPOSITIONS

[75] Inventors: Susan M. Cady, Yardley, Pa.; Werner J. Blank, Wilton; Peter J. Schirmann, Fairfield, both of Conn.

[73] Assignee: American Cyanamid Company, Stamford, Conn.

[21] Appl. No.: 385,429

[22] Filed: Jun. 7, 1982

[51] Int. Cl.$^3$ .............................................. C08F 8/12
[52] U.S. Cl. ................................. 525/118; 525/127; 525/176; 525/221; 525/223; 525/328.2; 525/328.4
[58] Field of Search ................ 525/118, 127, 176, 221, 525/223, 328.2, 328.4

[56] References Cited

U.S. PATENT DOCUMENTS

| | | | |
|---|---|---|---|
| 3,766,144 | 10/1973 | Hudson et al. | 526/304 |
| 4,062,831 | 12/1977 | Kopecek et al. | 526/304 |
| 4,289,676 | 9/1981 | Czauderna et al. | 526/304 |

FOREIGN PATENT DOCUMENTS 20000  10/1980  European Pat. Off. .

*Primary Examiner*—Joseph L. Schofer
*Assistant Examiner*—Bernard Lipman
*Attorney, Agent, or Firm*—Steven J. Hultquist

[57] ABSTRACT

Coating compositions comprising a polymer containing repeating units derived from alkyl acrylamidoglycolate alkyl ethers or acrylamidoglycoamide alkyl ethers and reactive functions selected from hydroxy, carboxy and/or amido groups provide crosslinking coating compositions which are low in toxicity and low in evolution of toxic volatile reaction products.

9 Claims, No Drawings

CROSSLINKING COATING COMPOSITIONS

This invention relates to a coating composition which is crosslinked upon heat curing. More particularly, this invention relates to such a composition wherein crosslinking occurs between an alkyl acrylamidoglycolate alkyl ether or an acrylamidoglycoamide alkyl ether of a polymer and a reactive hydroxy, carboxy, and/or amido group also associated with the composition.

In the past, crosslinkable coating compositions employing heat curing employed amidoformaldehyde resins and/or alkoxymethylacrylamides. These compositions upon heat curing release considerable amounts of toxic formaldehyde. Other crosslinkable compositions include those containing isocyanate or epoxide moieties. These moieties are very toxic or mutagenic. Due to the dangers associated with handling and heat curing these prior art coating compositions, there exists an urgent need for coating compositions that are low in toxicity and low in the evolution of toxic volatile reaction products. The provision for such a composition would fulfill a long-felt need and constitute a significant advance in the art.

In accordance with the present invention, there is provided a crosslinking coating composition comprising (1) a polymer containing repeating units derived from an alkyl acrylamidoglycolate alkyl ether or acrylamidoglycoamide alkyl ether and optionally (2) a reactive function selected from hydroxy, carboxy, and amido groups whereby interaction between alkylacrylamidoglycolate alkyl ether or acrylamidoglycoamide alkyl ether of said polymer and said reactive function upon heat curing produces a crosslinked polymeric structure, said alkyl acrylamidoglycolate alkyl ether being derived from acrylamido- or methacrylamido glycolic acid and containing an ester group selected from alkyls of 1–6 carbon atoms, cycloalkyls of 5–6 carbon atoms and 2'-hydroxyalkyls of 2–6 carbon atoms and an alkyl ether group selected from alkyls of 1–6 carbon atoms and cycloalkyls of 5–6 carbon atoms or an acrylamidoglycoamide alkyl ether being derived from acrylamido- or methacrylamidoglycolic acid containing an amide group selected from primary or secondary aliphatic or cycloaliphatic amines of 1 to 20 carbons and optionally oxygen or nitrogen atoms, and an alkyl ether group selected from alkyls of 1–6 carbon atoms and cycloalkyls of 5–6 carbon atoms.

The composition of the present invention gives as the reaction byproduct an alcohol which is low in toxicity and avoids dangers associated with prior crosslinking compositions. The composition is readily cured by heat and may be catalyzed, if desired. In preferred instances, the reactive functions are present in the polymer containing the alkyl acrylamidoglycolate alkyl ether or acrylamidoglycoamide alkyl ether units and no additional ingredients are necessary to provide the self-crosslinking composition. The present invention also provides the compositions which have been crosslinked by heat curing.

Compositions of the present invention will comprise a polymer containing repeating units derived from an alkyl acrylamidoglycolate alkyl ether or an acrylamidoglycoamide alkyl ether and optionally additionally one or more other repeating units derived from monomers copolymerizable with the alkyl acrylamidoglycolate alkyl ether or acrylamidoglycoamide alkyl ether. The monomers providing the required repeating units will have the general structures:

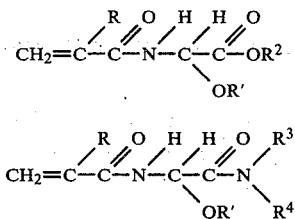

wherein R is hydrogen or methyl, R' is selected from alkyls of 1–6 carbon atoms and cycloalkyls of 5–6 carbon atoms, $R^2$ is selected from alkyls of 1–6 carbon atoms and cycloalkyls of 5–6 carbon atoms, each of which is optionally substituted with oxygen or nitrogen heteroatoms, and $R^3$ and $R^4$ are selected from hydrogen, alkyls or cycloaliphatic alkyls of 1 to 20 carbons optionally modified with nitrogen or oxygen moieties.

In the preferred method of preparing the acrylamidoglycoamide alkyl ether polymers, the alkyl acrylamidoglycolate alkyl ether is polymerized alone or in combination with comonomers to form the desired polymer. The ester functionality is then converted to the desired amide functionality by treatment with the corresponding amine.

The polymer may contain from 1 to 100 weight percent of the alkyl acrylamidoglycolate alkyl ether or acrylamidoglycoamide alkyl ether and preferably about 5 to 50 weight percent thereof.

Useful comonomers in preparing the polymer specified above include one or more of the following, for example, alkyl acrylate and methacrylates of 1–18 carbon atoms in the alkyl chain, styrene, a-methylstyrene, acrylonitrile, acrylic and methacrylic acids, maleic and fumaric acids or $C_1$ to 18 esters thereof, hydroxyethyl acrylate, acrylamide, methacrylamide, vinyl acetate and the like.

The composition of the present invention will also contain a reactive function selected from hydroxy, carboxy and amido group or combinations thereof. This content of reactive functions may arise in the composition in a number of manners. If the polymer containing the alkoxy acrylamidoglycolate alkyl ether or acrylamidoglycoamide alkyl ether units contain a comonomer providing hydroxy, carboxy and/or amido groups, the desired reactive function will be a part of the polymer composition and need not be additionally supplied. If the polymer does not contain the reactive function, the reactive function may be provided as repeating units of a separate added polymer. Suitable additional polymers include alkyl resins, polyester resins, glycidyl ether resins polyurethane resins and functional acrylic resins such as copolymers of alkyl acrylates and monomers such as maleic and fumaric acids, hydroxyethylacrylates, acrylic acids, acrylamides, and the like. All of these resins will, of course, contain hydroxyl, carboxyl, or amido groups or combinations thereof.

Alternatively, the reactive function may arise as low molecular weight diols, triols, polyols, polyetherglycols, polycarboxylic acids and/or polyamides such as ethylene glycol, glycerol, propylene glycol, diethylene glycol, trimethylol ethane, trimethylol propane, pentaerythritol, sorbitol, neopentylglycol, and polyether glycols derived from ethylene oxide, propylene oxide, sucrose, tetrahydrofuran propylene glycol and cyclohexane dimethanol.

In addition, any combination of manners of incorporating the reactive functions in the coating composition may be used.

A preferred composition is one in which the polymer containing the alkyl acrylamidoglycolate alkyl ether or an acrylamidoglycoamide alkyl ether also containing a comonomer providing a sufficient quantity of hydroxy, carboxy, and/or amido groups. A still more preferred composition is one in which a low molecular weight polyol is added to a polymer containing both alkyl acrylamidoglycolate alkyl ether or acrylamidoglycoamide alkyl ether and reactive functions selected from hydroxy, carboxy, and/or amido groups.

The amount of hydroxy, carboxy and/or amido groups present in the coating composition of the present invention may vary widely and is generally determined by a number of factors such as the extent of crosslinking desired, the nature of the reactants employed, and the like. Generally, the amount of reactive function present in the composition will vary from about 0.5 to 10 equivalents of reactive functionality to the alkoxy ether functionality of the alkyl acrylamidoglycolate alkyl ether or acrylamidoglycoamide alkyl ether, preferably about 0.5 to 1.5 equivalents, same basis.

The composition of the present invention is readily cured as a coating by exposure to a temperature of about 100° C. or higher for adequate time periods, usually at least about 20 minutes. Curing will, of course, depend upon temperature, composition, time, presence or absence of an accelerator and the like. The compositions after heat treatment will generally continue to show an advance in cure upon storage and improved properties will result. Curing may be accelerated, if desired, by addition to the composition prior to coating of a curing accelerator such as p-toluene-sulfonic acid or a transesterification catalyst such as a tin salt.

The invention is more fully illustrated in the examples which follow wherein all parts and percentages are by weight unless otherwise specified.

In the examples, solvent resistance is determined by methyl ethyl ketone (MEK) double rubs. The number reported represents the number of double rubs necessary to wear away 50% of the coating. This is an indication of the relative number of crosslinks made during cure of the film. Hardness is measured using a Tukon hardness tester and is reported in Knoop units ($Khn_{25}$). Film thickness is measured in mils.

EXAMPLE I

To a flask equipped with stirrer, condenser, nitrogen inlet, thermometer and dropping funnel was added 40 parts toluene. Methyl acrylamidoglycolate methyl ether 120.4 parts, was dissolved in 156.4 parts ethanol and 171.6 parts toluene and mixed with 10 parts methacrylic acid, 97.6 parts butyl acrylate, 172 parts methyl methacrylate and 10.64 parts 75% t-butylperoxyisobutyrate. This monomer mix was poured into the dropping funnel. The system was purged with nitrogen for 20 minutes. The toluene in the flask was heated to 83° C. and the monomer mix added slowly over 3 hours. After the addition was completed, the solution was refluxed at 80° C. for 3 hours and then filtered hot through a preheated pressure funnel. When cool, the polymer is ready to use. This polymer is clear and yellow colored with dish solids (105° C.—2 hrs.) 52.15% NV.

EXAMPLE 2

The procedure of Example 1 is again followed except that the following reagents are used: 40 parts toluene, 100 parts methyl acrylamidoglycolate methyl ether, 156.4 parts ethanol, 171.6 parts toluene, 10 parts methacrylic acid, 107.6 parts butyl acrylate, 182 parts methyl methacrylate and 10.64 parts 75% t-butylperoxyisobutyrate. This polymer is clear amber colored with dish solids of 53.5% nonvolatiles.

EXAMPLE 3

The procedure of Example 1 is again followed except that the following reagents are used: 80 parts toluene, 160 parts methyl acrylamidoglycolate methyl ether, 312.8 parts ethanol, 342.2 parts toluene, 20 parts methacrylic acid, 248 parts butyl acrylate, 396 parts methyl methacrylate, 8.0 parts dodecylmercaptan, and 21.28 parts 75% t-butylperoxyisobutyrate. The polymer is clear yellow colored with dish solids of 54.9% nonvolatiles and has a Brokfield viscosity of 832 centipoises (Spindle ∩2, 20 rpm).

EXAMPLE 4

The polymer of Example 1 in the amount of 20 parts is diluted with 14.77 parts toluene. Films are cast on iron phosphate pretreated cold, rolled steel panels. The coated panels are individually cured for 20 minutes at 100° C., 125° C., 150° C. or 175° C. The properties of these films are shown in Table I.

EXAMPLE 5

The procedure of Example 4 is repeated except that 0.1 part 40% p-toluene sulfonic acid in proponal is added to the coating composition.

EXAMPLE 6

The polymer of example 2 in the amount of 20 parts is diluted with 15.67 parts toluene. Film casting and curing are as in Example 4.

EXAMPLE 7

The procedure of Example 6 is followed except that 0.107 parts 40% p-toluene sulfonic acid in propanol is added to the coating composition.

EXAMPLE 8

The polymer of Example 3 in the amount of 20 parts is diluted with 16.6 parts toluene. Film casting and curing are as in Example 4.

EXAMPLE 9

The procedure of Example 8 is followed except that 0.11 part of 40% p-toluene sulfonic acid is added to the coating composition.

EXAMPLE 10

The polymer of Example 3, 50 parts, is reacted with 2.2 parts of n-butylamine in 18.6 parts 2-ethoxy ethane to form the N-butyl acrylamidoglycoamide methyl ether. Films are cast and cured as in Example 4. The 175° C./20 minute cure film has 200 MEK solvent rubs while the 100° C./20 minute cure film has 25 MEK rubs.

EXAMPLE 11

The procedure of Example 1 is again followed except that the following reagents are used: 40 parts toluene, 120 parts methyl acrylamidoglycolate methyl ether, 156 parts ethanol, 172 parts toluene, 103 parts butyl acrylate, 177 parts methylmethacrylate, and 11 parts 75% t-butylperoxyisobutyrate. This polymer has a dish solids (105°—2 hrs.) of 56.4% NV.

EXAMPLE 12

The polymer of Example 11, 30 parts, is reacted with 2.6 parts N,N-dimethyl-1,3-propane diamine in 24 parts tetrahydrofuran. The resulting N,N-dimethylaminopropyl acrylamidoglycoamide containing polymer is neutralized with acetic acid. Films are cast and cured as in Example 4. The 150° and 175° C./20 minute cure films have 200+MEK solvent rubs while the 100° C./20 minute cure has 21 rubs.

EXAMPLE 13

The polymer of Example 11 is reacted with dibutyl amine. The resulting N,N-dibutyl acrylamidoglycoamide methyl ether containing polymer is cast into films and cured as in Example 4. Results are similar to those obtained from the N-butyl amide derivative.

EXAMPLE 14

The procedure of Example 1 is again followed except that the following reagents are used: 80 parts toluene, 160 parts methyl acrylamidoglycolate methyl ether, 312 parts ethanol, 342 parts toluene, 320 parts butyl acrylate, 300 parts methyl methacrylate, 20 parts acrylic acid, 16 parts t-butylperoctoate, and 8 parts n-dodecylmercaptan. The polymer obtained had a dish solids (105° C., 2 hrs) of 53.3% NV.

EXAMPLE 15

The polymer of Example 14 in the amount of 25 parts is mixed with 0.014 parts of p-toluene sulfonic acid. Films are cast on chromate treated aluminum panels and cured as in Example 4. Film properties are given in Table 2.

EXAMPLE 16

The polymer of Example 14 in the amount of 50 parts is mixed with 1.4 parts trimethylolpropane and 0.016 parts p-toluene sulfonic acid in 6.5 parts 2-ethoxyethane. Films are cast and cured as in Example 15. Film properties are given in Table 2.

EXAMPLE 17

The polymer of Example 14 in the amount of 50 parts is mixed with 2.3 parts cyclohexane dimethanol and 0.016 parts p-toluene sulfonic acid. Films are cast and cured as in Example 15. Film properties are given in Table 2.

EXAMPLE 18

The polymer of Example 14 in the amount of 50 parts is mixed with 22 parts of a commercially available styrene/butyl acrylate/acrylic acid polymer (75% solids, acid number 110) dissolved in 5 parts butanol. Films are cast and cured as in Example 15. Film properties are given in Table 2.

EXAMPLE 19

The polymer of Example 14 in the amount of 50 parts is mixed with 5.9 parts of a commercially available polyester resin (96% solids, hydroxyl number 280) and 0.03 parts p-toluene sulfonic acid. Films are cast and cured as in Example 15. The 150° C./20 minute cure has 90 MEK solvent rubs while the 125° C./20 minute cure has 6 MEK rubs.

TABLE I
SELF CROSSLINKED FILMS

| | POLYMER COMPOSITION % | | | | AVG. | MEK RESISTANCE | | | | KNOOP HARDNESS | | | |
|---|---|---|---|---|---|---|---|---|---|---|---|---|---|
| Ex. | MAGME | MMA | BA | MAA | MW | 100° C. | 125° C. | 150° C. | 175° C. | 100° C. | 125° C. | 150° C. | 175° C. |
| 4 | 29.5 | 42.2 | 23.9 | 2.45 | 54 × 10³ | 10 | 15 | 185 | 200+ | 12.4 | 12.8 | 13.0 | 13.9 |
| 5 | 29.5 | 42.2 | 23.9 | 2.45 | 54 × 10³ | 10 | 70 | 200+ | 200+ | 12.7 | 12.7 | 16.3 | 19.6 |
| 6 | 24.5 | 44.7 | 26.4 | 2.45 | 70 × 10³ | 8 | 7 | 8 | 200 | 12.4 | 11.5 | 11.7 | 12.8 |
| 7 | 24.5 | 44.7 | 26.4 | 2.45 | 70 × 10³ | 5 | 11 | 200 | 200+ | 13.2 | 12.8 | 12.4 | 13.4 |
| 8 | 18.9 | 46.7 | 29.2 | 2.4 | 61 × 10³ | 15 | 90 | 200+ | 200+ | 13.0 | 13.9 | 15.6 | 16.3 |
| 9 | 18.9 | 46.7 | 29.2 | 2.4 | 61 × 10³ | 8 | 143 | 63 | 200 | 10.3 | 12.4 | 14.8 | 13.9 |

| | FILM THICKNESS, MILS | | | | 20° GLOSS | | | | HOURS TO FAIL WATER IMMERSION | | | |
|---|---|---|---|---|---|---|---|---|---|---|---|---|
| Ex. | 100° C. | 125° C. | 150° C. | 175° C. | 100° C. | 125° C. | 150° C. | 175° C. | 100° C. | 125° C. | 150° C. | 175° C. |
| 4 | 1.1 | 1.0 | 1.2 | 1.0 | 90 | 94 | 87 | 95 | 53 | 192 | 192 | 576+ |
| 5 | 1.0 | 1.0 | 1.1 | 0.9 | 100+ | 96 | 85 | 98 | 53 | 53 | 192 | 576+ |
| 6 | 1.0 | 1.0 | 1.1 | 0.95 | 100+ | 93 | 88 | 96 | 53 | 576+ | 576+ | 576+ |
| 7 | 1.0 | 1.0 | 1.1 | 1.0 | 99 | 95 | 86 | 90 | 53 | 576+ | 576+ | 576+ |
| 8 | 1.0 | 0.95 | 1.1 | 0.95 | 84 | 94 | 80 | 88 | 53 | 192 | 192 | 576+ |
| 9 | 1.0 | 0.95 | 1.0 | 0.95 | 88 | 96 | 98 | 89 | 53 | 576+ | 576+ | 576+ |

| | HOURS TO FAIL SALT SPRAY | | | | HOURS TO FAIL HUMIDITY 38° C. | | | | HOURS TO FAIL HUMIDITY 60° C. | | | |
|---|---|---|---|---|---|---|---|---|---|---|---|---|
| Ex. | 100° C. | 125° C. | 150° C. | 175° C. | 100° C. | 125° C. | 150° C. | 175° C. | 100° C. | 125° C. | 150° C. | 175° C. |
| 4 | 144 | 144 | 240 | 336 | 24 | 24 | 24 | 1900+ | 24 | 24 | 24 | 48 |
| 5 | 144 | 144 | 144 | 336 | 24 | 24 | 120 | 1900+ | 24 | 24 | 24 | 336 |
| 6 | 144 | 144 | 336 | 336 | 24 | 528 | 1900+ | 720 | 24 | 24 | 24 | 48 |
| 7 | 144 | 144 | 336 | 240 | 24 | 720 | 1900+ | 1900+ | 24 | 24 | 24 | 336 |
| 8 | 144 | 144 | 144 | 336 | 24 | 24 | 24 | 1900+ | 24 | 24 | 24 | 336 |
| 9 | 144 | 144 | 336 | 336+ | 24 | 720 | 1900+ | 1900+ | 24 | 24 | 24 | 24 |

| | HOURS TO FAIL XENON WEATHEROMETER | | | |
|---|---|---|---|---|
| Ex. | 100° C. | 125° C. | 150° C. | 175° C. |
| 4 | 222 | 222 | 222 | 1018 |
| 5 | 222 | 222 | 222 | 1018 |
| 6 | 222 | 222 | 1018 | 1018 |

TABLE I-continued

| SELF CROSSLINKED FILMS | | | | |
|---|---|---|---|---|
| 7 | 222 | 222 | 222 | 222 |
| 8 | 222 | 222 | 222 | 1018 |
| 9 | 222 | 222 | 222 | 222 |

NOTES:
MAGME = METHYL ACRYLAMIDOGLYCOLATE METHYL ETHER
MMA = METHYL METHACRYLATE
BA = BUTYL ACRYLATE
MAA = METHACRYLIC ACID
MW = MOLECULAR WEIGHT
MEK = METHYL ETHYL KETONE

TABLE 2

| Example 6 | Cure Temp. °C. | Knoop Hardness | MEK Resistance | 38° C. Humidity | 40° C. Water Immersion | 2000 hr Xenon 20° Gloss |
|---|---|---|---|---|---|---|
| 15 | 125 | 1.8 | 54 | 24 hr | 24 hr | 82 |
|  | 150 | 5.8 | 200+ | 288 hr | 600 hr | 100+ |
|  | 175 | 9.8 | 200+ | 288 hr | 1300+ hr | 95 |
| 16 | 125 | 1.3 | 3 | 24 hr | 24 hr | 45 |
|  | 150 | 4.9 | 100 | 840 hr | 650 hr | 100+ |
|  | 175 | 7.8 | 100 | 1500+ hr | 1200+ hr | 99 |
| 17 | 125 | 1.2 | 6 | 24 hr | 24 hr | 25 |
|  | 150 | 6.6 | 200 | 1500+ hr | 1270+ hr | 100+ |
|  | 175 | 5.4 | 200 | 840+ hr | 600+ hr | 93 |
| 18 | 125 | 1.0 | 3 | 24 hr | 24 hr | — |
|  | 150 | 1.5 | 10 | 24 hr | 24 hr | — |
|  | 175 | 2.6 | 200 | 720 hr | 1776 hr | — |

What is claimed:

1. A crosslinkable coating composition comprising (1) a polymer containing repeating units derived from an alkyl acrylamidoglycolate alkyl ether or an acrylamidoglycoamide alkyl ether and (2) a source of hydroxy, carboxy, or amido groups selected from the class consisting of (a) other repeating units of said polymer containing such hydroxy, carboxy, or amido groups and (b) compounds other than said polymer containing at least two reactive functional groups selected from hydroxy, carboxy, and amido, said hydroxy, carboxy or amido groups being reactive with alkoxy ether functionality of said repeating units derived from said alkyl acrylamidoglycolate alkyl ether or said acrylamidoglycoamide alkyl ether upon heat curing to produce a crosslinked polymeric structure, said alkyl acrylamidoglycolate alkyl ether being derived from acrylamido- and methacrylamidoglycolic acid and containing an ester group selected from alkyls of 1-6 carbon atoms, cycloalkyls of 5-6 carbon atoms and 2-hydroxy alkyls of 2-6 carbon atoms and cycloalkyls of 5-6 carbon atoms, and said acrylamidoglycoamide alkyl ether being derived from acrylamido- or methacrylamido acid containing an amide group derived from a primary or secondary aliphatic or cycloaliphatic amine with $C_1$ to $C_{20}$ carbon atoms optionally substituted with oxygen or nitrogen.

2. The composition of claim 1 wherein said source of hydroxy, carboxy or amido groups is said other repeating units of said polymer.

3. The composition of claim 1 wherein said source of hydroxy, carboxy or amido groups is an additional polymer.

4. The composition of claim 1 wherein said source of hydroxy, carboxy or amido groups is a low molecular weight diol, polyol, polycarboxylic acid or polyamide.

5. The composition of claim 2 wherein a low molecular weight polyol is also present.

6. The composition of any one of claims 1, 2, 3, 4 and 5 also containing a curing accelerator.

7. A heat cured crosslinked composition of any one of claims 1, 2, 3, 4, 5 and 6.

8. The composition of claim 1 wherein said source of hydroxy, carboxy or amido groups is:
   (i) an additional polymer selected from the group consisting of alkyd resins, polyester resins, glycidyl ether resins polyurethane resins, copolymers of alkyl acrylate and comonomers selected from maleic acid, fumaric acid, hydroxyethylacrylate, acrylic acid, and acrylamide; or
   (ii) compounds selected from the group consisting of ethylene glycol, glycerol, propylene glycol, diethylene glycol, trimethylol ethane, trimethylol propane, pentaerythritol, sorbitol, neopentylglycol, and polyether glycols derived from ethylene oxide, propylene oxide, sucrose, tetrahydrofuran propylene glycol and cyclohexane dimethanol.

9. The composition of claim 1 wherein the amount of hydroxy, carboxy, or amido groups is from about 0.5 to about 10 equivalents of hydroxy, carboxy, or amido functionality to said alkoxy ether functionality derived from said alkyl acrylamidoglycolate alkyl ether or acrylamidoglycoamide alkyl ether.

* * * * *